United States Patent Office 3,127,455
Patented Mar. 31, 1964

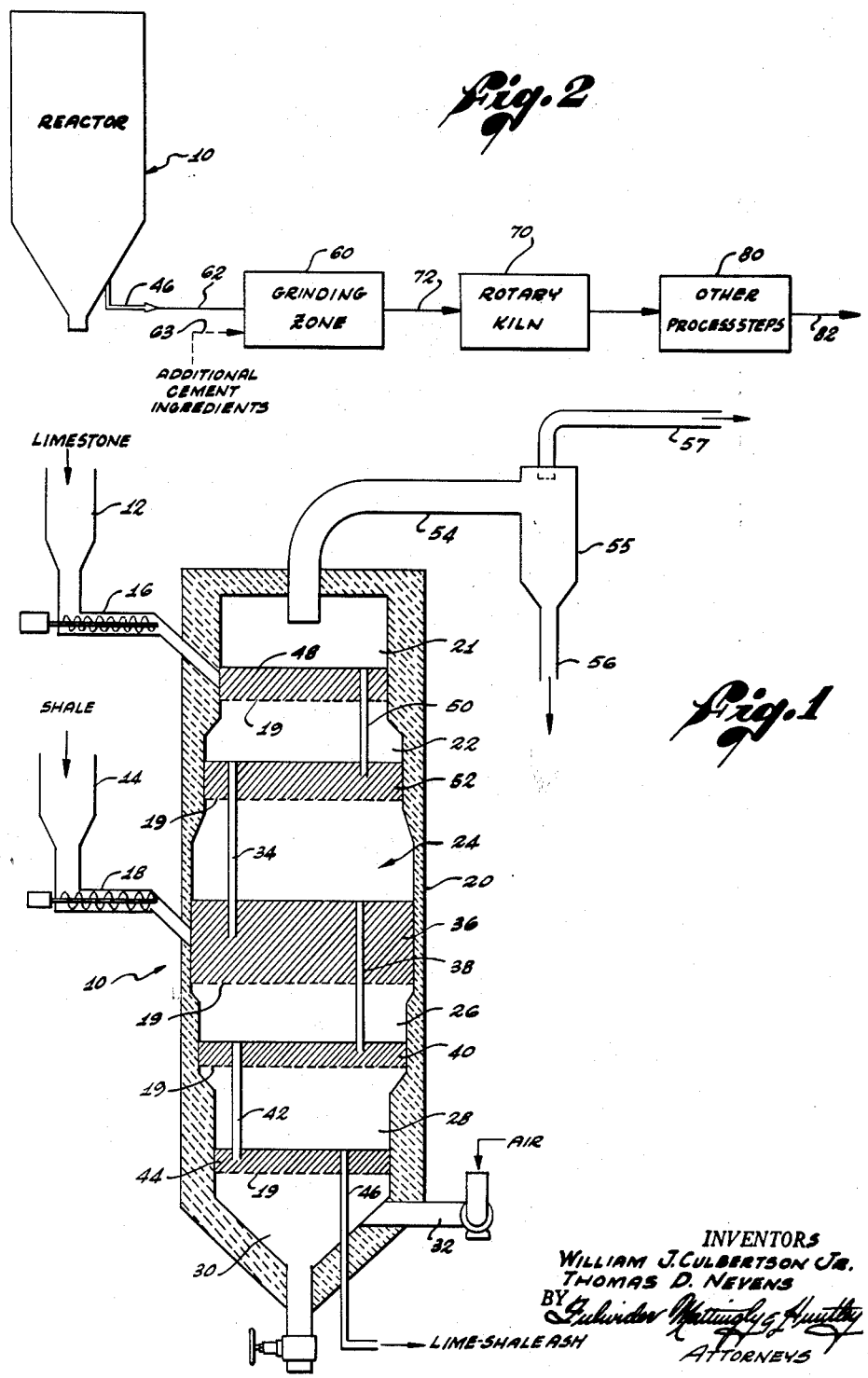

3,127,455
METHOD FOR MAKING CEMENT
William J. Culbertson, Jr., and Thomas D. Nevens, Denver, Colo., assignors, by mesne assignments, to The Oil Shale Corporation, Beverly Hills, Calif., a corporation of Nevada
Filed May 31, 1960, Ser. No. 32,985
5 Claims. (Cl. 263—53)

This invention relates generally to a method and means for making cement, and relates more particularly to a method and means for making cement wherein ash from oil shale forms an appreciable part of the material fed to the cement kiln.

It is known that the inorganic matter or ash remaining upon combustion of the organic matter in oil shale may be combined with limestone, and then subjected to reaction at high temperatures, with silica, alumina, and other oxides. Such reaction produces cementitious compounds such as dicalcium silicate and tricalcium aluminate, etc. and the product is then cooled and processed in the usual manner as cement made from limestone and other commonly used raw materials. The cement produced from the ash-lime base is every bit as useful as cement manufactured by the usual calcination of limestone and the other commonly used raw materials. It will be noted that the oil shale ash has lime or limestone contained in it, as well as silica, alumina and other oxides, and is therefore ideally chemically suited for the making of cement. A typical composition of a Colorado oil shale follows:

| | Percent |
|---|---|
| $SiO_2$ | 43.5 |
| $Al_2O_3$ | 12.1 |
| CaO | 21.9 |
| MgO | 9.3 |
| $Fe_2O_3$ | 4.7 |
| $Na_2O$ | 3.4 |
| $K_2O$ | 2.4 |
| S | 2.2 |

The use of oil shale ash also has the great advantage that very large deposits of oil shale are readily available, and these oil shale deposits have, in addition, substantial heat value which can be employed to render the cement-making process as economical as possible.

In the past, in order to make economical use of the heat value in the oil shale, oil shale has been pyrolyzed and combusted in pyrolysis and combustion zones in order that shale oil and hot flue gases are produced, in addition to the production of oil shale ash.

The oil shale ash is then admixed with limestone, after drying and grinding, and sent into the cement kiln for the manufacture of cement. The kiln may be heated, in part, by means of the shale oil. The hot flue gases may also be employed as a source of heat. Alternatively, these gases can be sent to waste heat boilers, and the heat is used to produce power.

In the processes just mentioned, the shale oil must be stored awaiting use. Secondly, in order to take advantage of the heat in the combusted flue gases, it is either converted to power in waste heat boilers, or blown into the cement kiln. Extra equipment (waste heat boilers) is required if the heat is converted to power and serious dust problems result from using the hot gases directly in the kiln.

Also, in the past, rather than pyrolyzing and combusting the oil shale in a zone separate from that of the rotary cement kiln, pyrolysis and combustion of the oil shale in the rotary cement kiln itself has been attempted. There are several major disadvantages which are inherent in such a process. First, the oil shale and limestone introduced into the rotary cement kiln must be dried and finely ground. The grinding cost is relatively high because the oil shale prior to pyrolysis, has organic binding material therein, preventing its ready breakdown. Secondly, because of the pyrolyzation of oil shale and ensuing combustion of the oil and carbonaceous residue in the cement kiln, the temperature of the exhaust gases is so high that they must be cooled before they can be sent to Cottrell precipitators. This, of course, is wasteful of heat and water.

The combustion of oil and carbonaceous shale residue contributes to instability in cement kiln operation, and to difficulties in control of temperature in the cement kiln. Even if the oil shale is first mixed with lime, and the mixture preheated by exhaust gases from the cement kiln in a separate preheater zone, the temperature of the exhaust gases leaving the preheater is so high due to the combustion of oil and shale coke in the preheater, that these exhaust gases must also be substantially cooled before being sent to the Cottrell precipitators. Therefore, heat and water are again wasted, and the combustion of oil and shale coke contributes to instability in operation, and difficulties in control of the temperatures in the preheater.

In view of the foregoing, it is a major object of the present invention to produce a cement product, the raw materials of which include limestone and oil shale ash, by a method and means which utilize the heat value of the oil shale in a manner highly improved over that of the prior art.

Another object of the present invention is to provide a method and means for producing cement, the raw materials of which include limestone and oil shale ash, wherein the cement-making capacity of a rotary cement kiln of given size is substantially increased over the prior art.

Still another object of the present invention is to provide a method and means for producing cement, the raw materials for which include limestone and oil shale ash, wherein the heat of combustion of the organic material in the oil shale is utilized for calcination of limestone without the disadvantages found in the prior art of instability and uncontrollability of cement preheaters and kilns, and the inefficient use of the combustibles of the oil shale.

Yet another object of the present invention is to provide a method and means for producing cement, the raw materials of which include limestone and oil shale ash, wherein the grinding costs of these materials are reduced and the heat value of the oil shale is efficiently employed in a highly improved manner.

These and other objects of the present invention will become clearly understood by referring to the following description and to the accompanying drawings, in which:

FIGURE 1 is an elevational view, in cross section, of a limestone-oil shale reactor of our invention for producing lime and ash feed for the rotary cement kiln; and FIGURE 2 is a schematic flowsheet for making cement incorporating the novel method and means of our invention.

In general, our invention comprises a method and means for combusting particulate oil shale and calcining particulate limestone respectively in a single fluidized zone. The heat evolved, due to combustion of the oil shale, is transferred to the limestone which is intimately mixed therewith, and thereby effects its calcination in an extremely efficient manner due to fluidization techniques involved. Oil shale ash and lime are thereby produced. It is preferable that the ratio of limestone to oil shale ash introduced be such as to enable substantially complete calcination to take place, although a greater relative amount of limestone may, if desired, be introduced, resulting in partially calcined limestone and oil shale ash.

The hot gases resulting from the combustion are then passed upwardly into and through one or more spaced fluidized beds of limestone which are moving downwardly into the calcining and combustion zone. In this manner, heat in the combusted flue gases can be extracted and transferred to the limestone to preheat the same prior to calcination.

Further, the ash and lime produced in the calcination and combustion zone possess substantial amounts of heat. This heat may be extracted by means of cold air passing through the ash and lime in one or more separate cooling zones. The air, thus preheated, can be employed for the combustion of the oil shale in the combustion and calcining zone, as well as for fluidization.

The resulting ash and lime, after preheating the air, still possess substantial amounts of heat, and are preferably sent directly to the usual rotary cement kiln.

The usual cementing ingredients, and limestone if desired, are blended with the ash-lime mixture, and these ingredients are all added to the cement kiln along with the previously calcined lime and ash. The amount of calcination in the cement kiln is thus substantially reduced and the heat requirements of the kiln are, therefore, also substantially reduced by an amount equivalent to the heat of disassociation of the previously calcined limestone. Alternatively, the capacity of the cement kiln for making cement can be substantially increased since the same heat requirement originally required for calcination can be employed in promoting reaction of the silica, alumina, etc. with the ash and lime to make cement clinker.

Further, our process reduces the cost of grinding the oil shale, as will be explained in detail hereafter.

Referring now especially to FIGURE 1, an elevational view in cross section, of the reactor 10 of our invention is shown. The function of our reactor 10 is the manufacture of lime and shale ash, the lime and ash thus manufactured being ground in zone 60, and thence fed into cement kiln 70, as shown in FIGURE 2. The manufacture of lime and ash in reactor 10 will first be described in detail.

Limestone ($CaCO_3$) and oil shale are first crushed to a fluidizable size, e.g., to a size of ½" or less average mesh size, and are introduced into feed hoppers 12 and 14 respectively. The feed hoppers 12 and 14 have conveyor lines 16 and 18 respectively leading into the reactor 10 at different levels thereof for reasons that will become apparent hereafter.

The reactor 10 comprises a vertical elongated chamber having walls made of firebrick or other high-temperature-resistant material. A plurality of grids or perforated plates or members 19, made of stainless steel or other high-temperature material, are spaced apart within the chamber so as to form a plurality of zones or compartments 21, 22, 24, 26, 28 and 30. The upper compartments 21 and 22 are limestone preheating zones, the intermediate compartment 24 is a combustion and calcining zone, and the lower compartments 26 and 28 are zones for the cooling of the lime and ash mixture.

The coarsely ground oil shale is fed into the intermediate zone 24 via line 18, and fluidization of the oil shale is provided by means of air or other oxidizing gas moving upwardly from the lower zones 26 and 28. Coarsely ground preheated limestone is also fed into the intermediate zone 24 from downcomer 34, and a fluidized bed 36 is thus formed in this zone. The heat produced by the combustion of the oil shale in the bed 36 is sufficient to cause calcination of all or part of the limestone, the amount calcined depending upon the amount of limestone present and on other factors. Due to the fluidization of the oil shale and limestone solids in the bed 36, the heat in the combustion gases and the shale ash is transferred to the limestone in an extremely efficient manner to cause the calcination thereof.

The temperature of the calcination and combustion zone 24 is closely controllable and is maintained within narrow limits, preferably between about 1500° F. and about 1850° F. At approximately 1500° F. the limestone starts to calcine, and at approximately 1850° F. the shale ash and limestone react to form an undesirable liquid phase or to fuse.

The depth of the fluidization bed 36 is maintained generally constant, the downcomer 38 taking the overflow of calcined lime and shale ash and passing this mixture into the next lower zone 26. The calcined lime and shale ash form a bed 40 in zone 26 and have a temperature of approximately 200 to 300° F. less than in zone 24 (i.e., a temperature of between 1200 and 1650° F.) and are cooled and fluidized by cooler air passing upwardly therethrough.

The cooled lime and shale ash mixture then overflows into downcomer 42 and into fluidized bed 44 in zone 28. The mixture is further cooled and fluidized by air moving upwardly therethrough. The bed 44 is maintained at a temperature of between 900° F. and 1350° F.

The lime and shale ash leave the reactor 10 at a temperature of 900 to 1350° F., via line 46, and are preferably sent directly to the grinding zone 60 via line 62. Also, of course, the cold air, entering the reactor 10, via duct 32, is preheated in its passage through zones 28 and 26, prior to its entry into the combustion and calcination zone 24.

The amount of air employed is at least sufficient to cause complete combustion of the organic matter in the particular oil shale employed. The organic matter includes oil, carbon, hydrogen and sulfur. The particle size of the limestone and oil shale is adjusted so that the requisite amount of air added will fluidize these solids.

The coarsely ground limestone is preheated, prior to its entry into the calcination and combustion zone 24, by being passed through several preheating zones 21 and 22. The limestone enters compartment or zone 21, via line 16, and forms bed 48. The limestone is fluidized in bed 48 by combustion gases passing upwardly from zones 24 and 22. The bed 48 attains a temperature of about 600° F. to 1000° F.

The fluidized limestone overflows from bed 48 by means of downcomer 50, and enters a second bed 52 in zone 22 where the limestone is again fluidized and further preheated to a temperature of between 1000° F. to 1400° F. by the combustion gases passing upwardly from zone 24.

The exhaust gases leave zone 21, with some fines entained therein, via overhead pipe 54. The fines are removed by means of cyclone 55, and leave via line 56, the exhaust gases being disposed of via line 57. Part of the fines, if large in quantity, and if only partially burned or calcined, can be led back to one of the preheat compartments 21 or 22, or to zone 24.

It will thus be seen that the reactor 10 provides a means for calcining all or part of the limestone in a fluidized state by means of heat transferred to it from hot gases and ash produced by the substantially complete combustion of oil shale. These hot gases are then cooled by being passed countercurrently through fresh limestone in one or more zones separate from that of the calcination and combustion zone 24. The calcined lime and shale ash then give up part of their heat by being passed countercurrently to cold air, thereby preheating air used for the combustion.

The calcining of limestone, together with the production of ash and lime, is thus accomplished in a highly efficient and economical manner. The organic material in the oil shale, which in the ordinary cement-making process is a troublesome constituent, is eliminated from the lime-ash mixture produced, while making full use of the heat of combustion of such organic material. The amount of heat extracted from the combustion gases can be increased by adding more preheating compartments or zones. Similarly, the amount of heat extracted from the lime and ash can be increased by adding more cooling compartments or zones. Also, by adding either more preheating or more cooling compartments or zones, the larger the quantity of limestone that can be calcined. Of course, as the compartments increase, the capital and blower power costs increase, and an economic balance will determine the optimum number of compartments to be used in any particular system.

It is also possible to eliminate the preheating and cooling compartments entirely, and to feed both fresh oil shale and fresh limestone directly to a combustion and concination zone. This, however, is not the preferable mode of operation.

The ratio of oil shale to limestone feed rates employed is flexible and depends on a number of factors, the chief factors being: (1) the number of preheating and cooling compartments used; (2) the heat of combustion of the particular shale; (3) the amount of calcium and magnesium carbonate in the shale and limestone; (4) the water content of the shale and limestone; (5) the temperature to be maintained in the combustion and calcination zone 24; (6) the amount of excess air used; and (7) the heat capacities of the oil shale and the limestone.

Referring now especially to FIGURE 2, the partially or completely calcined limestone and ash mixture is fed into grinding zone 60, via line 62, along with additional limestone and other cement ingredients, if any, from line 63. It may be that the amount of limestone added to reactor 10 is so great that complete calcination of the limestone is not obtained. In such cases, it may be preferable to add little, if any more limestone to the grinding zone 60. However, in the normal case, additional limestone will be added to zone 60.

The grinding zone 60 may comprise a ball mill and the shale ash and lime are there ground to at least −100 mesh.

The fine grinding at this point in the process is economically advantageous. Prior to the combustion of the oil shale, the present of certain organic materials which are effective adhesive or binding agents, prevents breakdown and grinding of the shale. After combustion, however, the organic materials are removed, and the breakdown and grinding of the shale ash are facilitated. The calcined limestone, moreover, is easier to grind than raw limestone. Also, expensive drying operations which are necessary for fine grinding prior to combustion or calcination are eliminated.

The ground shale ash and lime are then sent to a cement kiln 70, via line 72, which is usually of conventional design, i.e., a very long, rotary slightly inclined drum. The ash and line may have a temperature of about 500° F. depending upon the amount of raw limestone added. The cement kiln is maintained at a temperature of 1850–2800° F. in its hottest zone, temperatures within this range being necessary for fusion and reaction of the cement ingredients, to form cementitious ingredients, e.g., silicates and aluminates. Any conventional fuel can be employed to maintain the cement kiln 70 at the requisite temperature.

The raw cement is discharged as clinker from the kiln 70 and cooled, in any conventional manner, and sent to additional process steps, designated generally by box 80. For example, a retarder such as gypsum can be added to the raw cement, and the mixture pulverized. The finished cement leaves the process along line 82.

If desired, the kiln 70 may comprise two sections—a preheater section into which the cement material first enters and a reaction kiln into which the preheated material passes and is heated to the temperature specified above for the kiln 70.

A typical example of our process follows: one ton/hour of cold Michigan oil shale, having a heat of combustion of 2180 B.t.u./lb., is introduced into bed 36 for combustion; 1.5 tons/hour of cold limestone is fed into fluidized bed 48 via line 16, and 2550 lbs./hr. of 100° F. air are introduced into the reactor via duct 32.

At equilibrium, the temperatures existing in the various beds are as follows.

| Fluidized Bed: | Temp. (° F.) |
|---|---|
| 48 | 800 |
| 52 | 1230 |
| 36 | 1700 |
| 40 | 1450 |
| 44 | 1150 |

The gas analysis of the exhaust gas, leaving line 57, was as follows.

| Gas: | Pounds/Hour |
|---|---|
| $CO_2$ (from $CaCO_3$ calcination) | 1320 |
| $CO_2$ (from C) | 879 |
| $SO_2$ (from $FeS_2$) | 264 |
| $H_2O$ (from $H_2$) | 180 |
| $N_2$ | 1960 |

The product, leaving via line 46, consisted of 0.84 ton/hour of lime (CaO) and 0.87 ton/hour of shale ash, having a temperature of about 1100° F. The limestone was completely calcined.

The lime and ash are then sent to the grinding zone 60, are ground to −100 mesh, along with approximately 2.5 tons of limestone fed into the grinding zone 60 via line 63, and this mixture is sent directly to rotary kiln 70. The temperature of the mixture is about 500° F. at this point.

The kiln is maintained at 2800° F. in the hottest portion thereof to effect the desired fusion and reaction to produce cement. The cement clinker is then sent to other process steps and pulverized.

It will be seen from the foregoing that our process enables a substantially greater proportion of heat to be employed for the fusion and reaction in the cement kiln as compared to that for calcination of limstone, thereby greatly increasing the capacity of any given kiln. In addition, a blended shale ash and a partially or completely calcined limestone is first prepared in a highly economical and efficient manner without requiring any extraneous fuel. Only a relatively small and inexpensive fluidization reactor is required to produce the ash-line blend. And the usual difficulties due to presence of combustible organic matter in the shale during preheating are wholly eliminated.

While we have shown and described, in some detail, a presently preferred embodiment of the method and means of our invention for producing cement, changes and modifications may occur to those skilled in the art that lie within the scope of the invention. Hence, we do not intend to be limited by the preferred embodiment and variations thereof herein described, but only by the claims set forth below.

We claim:

1. In a process for producing cement, the improvement which essentially consists of: fluidizing particualte oil shale by means of an oxidizing gas; substantially completely combusting said fluidized oil shale by means of said oxidizing gas in a first zone to produce hot gases of combustion; fluidizing particulate limestone by means of said hot gases of combustion, and at least partially calcining said limestone in said first zone by means of heat transferred to said limestone from said hot gases of combustion; and transferring the oil shale ash resulting from said substantially complete combustion of said oil shale together with the resulting at-least-partially calcined limestone, and together with additional limestone, to a cement-making zone.

2. The process of claim 1 wherein the temperature of said first zone is maintained between about 1500 to about 1850° F. and the highest temperature of said cement-making zone is above about 1850° F.

3. In a process for producing cement, the improvement which essentially consists of: fluidizing particulate oil shale by means of air; substantially completely combusting said fluidized oil shale by means of said air in a first zone to produce hot gases of combustion and oil shale ash; fluidizing and preheating particulate limestone by means of said hot gases of combustion passing upwardly through said limestone in at least one preheating zone; transferring said preheated limestone to said first zone and, at least partially, calcining said limestone, in a fluidized state, by means of heat transferred to said limestone from said hot bases of combustion in said first zone; transferring the thus-produced mixture of said oil shale ash and said at-least-partially calcined limestone to at least one cooling zone; passing air upwardly through said cooling zone to fluidize and cool said mixture, and to preheat said air; and transferring said mixture from said cooling zone to another reacting zone for the production of cement.

4. The process of claim 3 wherein the temperature of said first zone is between about 1500–1850° F., and the temperature of said limestone preheating and air preheating zones are below about 1500° F.

5. A process for making cement, which essentially consists of: crushing oil shale and limestone to fluidizable size; substantially completely combusting oil shale in the presence of said limestone, in a first fluidized bed, a portion of the heat of the gases of combustion calcining at least a part of said limestone in said fluidized bed at a temperature of between 1500° and 1850° F.; passing said gases of combustion upwardly from said first fluidized bed into at least a second fluidized bed consisting of uncalcined limestone, said hot gases of combustion preheating said limestone prior to its transfer into said first fluidized bed; passing oil shale ash, resulting from combustion of oil shale in said first fluidized bed, in combination with said at-least-partially calcined limestone into at least one air preheating zone; passing air upwardly through said air preheating zone, to fluidize and cool said oil shale ash and at-least-partially calcined limestone, and to preheat said air; passing said preheated air into said first fluidized bed for combustion of said oil shale; grinding said ash and the at-least-partially calcined limestone; and transferring said ground ash and at-least-partially calcined ground limestone, together with additional limestone, to a cement kiln for reaction to produce cement.

References Cited in the file of this patent
UNITED STATES PATENTS

| | | |
|---|---|---|
| 1,536,165 | Tetens | May 5, 1925 |
| 1,828,270 | Anderson | Oct. 20, 1931 |
| 1,904,699 | Singmaster | Apr. 18, 1933 |
| 2,684,840 | Behme et al. | July 27, 1954 |
| 2,904,445 | Sellers et al. | Sept. 15, 1959 |